US008600574B2

(12) United States Patent
Hamilton, II et al.

(10) Patent No.: US 8,600,574 B2
(45) Date of Patent: Dec. 3, 2013

(54) DYNAMIC SPECIFICATION OF POWER SUPPLY SOURCES

(75) Inventors: Rick A. Hamilton, II, Charlottesville, VA (US); Julianne F. Haugh, Austin, TX (US); Clifford A. Pickover, Yorktown Heights, NY (US); James R. Kozloski, Yorktown Heights, NY (US); Brian M. O'Connell, RTP, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 12/468,555

(22) Filed: May 19, 2009

(65) Prior Publication Data

US 2010/0298998 A1    Nov. 25, 2010

(51) Int. Cl.
*G06F 1/26* (2006.01)
(52) U.S. Cl.
USPC .......................................... 700/295; 700/286
(58) Field of Classification Search
USPC ............. 700/22, 286, 295, 297, 298; 323/299
See application file for complete search history.

(56) References Cited

U.S. PATENT DOCUMENTS

| | | | | |
|---|---|---|---|---|
| 4,370,723 | A * | 1/1983 | Huffman et al. .............. | 700/295 |
| 4,916,328 | A * | 4/1990 | Culp, III ........................ | 700/295 |
| 5,880,667 | A | 3/1999 | Altavela et al. | |
| 5,894,422 | A | 4/1999 | Chasek | |
| 6,425,248 | B1 * | 7/2002 | Tonomura et al. ........... | 60/641.8 |
| 6,512,966 | B2 * | 1/2003 | Lof et al. ...................... | 700/291 |
| 6,522,030 | B1 * | 2/2003 | Wall et al. ....................... | 307/43 |
| 6,563,234 | B2 * | 5/2003 | Hasegawa et al. .............. | 307/66 |
| 6,882,904 | B1 | 4/2005 | Petrie et al. | |
| 6,885,914 | B2 | 4/2005 | Shimode et al. | |
| 6,891,478 | B2 | 5/2005 | Gardner | |
| 6,915,185 | B2 * | 7/2005 | Yamamoto et al. ........... | 700/286 |
| 6,927,503 | B2 * | 8/2005 | Enis et al. ........................ | 290/55 |
| 7,067,937 | B2 * | 6/2006 | Enish et al. ...................... | 290/55 |
| 7,177,728 | B2 | 2/2007 | Gardner | |
| 7,209,840 | B2 | 4/2007 | Petite et al. | |
| 7,245,035 | B2 * | 7/2007 | Anzioso et al. .................... | 290/2 |
| 7,359,809 | B2 * | 4/2008 | Bruno ............................. | 702/64 |
| 7,373,221 | B2 * | 5/2008 | Lal ................................ | 700/295 |
| 7,406,364 | B2 * | 7/2008 | Andren et al. ................ | 700/286 |

(Continued)

OTHER PUBLICATIONS

Notice of Allowance for U.S. Appl. No. 12/251,583, dated Jan. 21, 2011, now United States Patent 7953519 B2, issued May 31, 2011.

*Primary Examiner* — Charles Kasenge
(74) *Attorney, Agent, or Firm* — Jason Sosa; Mark Vallone (57) ABSTRACT

A method, a system and a computer program product for specifying the source of power and provider of carbon offsets for an electrical device or service. A power supply specification (PSS) utility enables a user or program to specify a preferred blend of power sources and preferred carbon offset provider via a set of programmable requirements and the utility dynamically configures the electrical device or service, based on those requirements. The PSS utility determines the instantaneous power consumption of the device based on the outputs of sensors that measure voltages and currents associated with the operation of the device. The PSS utility compares the device's power consumption with the power from available power generating sources against the set of programmable requirements. When the available power is unable to satisfy the programmable requirements and/or is not sufficient to fully power the device, the PSS utility automatically places the device into a reduced power state. The PSS utility reports information about the device's power consumption to the power supplier.

20 Claims, 6 Drawing Sheets

(56) References Cited

U.S. PATENT DOCUMENTS

| | | | |
|---|---|---|---|
| 7,430,545 B2 * | 9/2008 | Kanbara et al. | 705/412 |
| 7,478,070 B2 * | 1/2009 | Fukui et al. | 705/412 |
| 7,656,060 B2 * | 2/2010 | Algrain | 307/84 |
| 7,808,126 B2 * | 10/2010 | Stiesdal | 307/84 |
| 7,906,871 B2 * | 3/2011 | Freeman et al. | 307/85 |
| 7,953,519 B2 | 5/2011 | Hamilton, II et al. | |
| 7,974,742 B2 * | 7/2011 | Enis et al. | 700/291 |
| 8,019,445 B2 * | 9/2011 | Marhoefer | 700/26 |
| 2001/0025209 A1 * | 9/2001 | Fukui et al. | 700/295 |
| 2002/0087234 A1 * | 7/2002 | Lof et al. | 700/286 |
| 2003/0105556 A1 * | 6/2003 | Enis et al. | 700/286 |
| 2003/0220720 A1 * | 11/2003 | Shimode et al. | 700/296 |
| 2004/0030457 A1 | 2/2004 | Bayoumi et al. | |
| 2004/0098142 A1 | 5/2004 | Warren et al. | |
| 2004/0181660 A1 | 9/2004 | Kato et al. | |
| 2005/0055137 A1 | 3/2005 | Andren et al. | |
| 2005/0125701 A1 * | 6/2005 | Hensbergen et al. | 713/320 |
| 2005/0165511 A1 * | 7/2005 | Fairlie | 700/286 |
| 2006/0208571 A1 * | 9/2006 | Fairlie | 307/11 |
| 2006/0276938 A1 * | 12/2006 | Miller | 700/295 |
| 2007/0079611 A1 * | 4/2007 | Doland | 60/495 |
| 2007/0271006 A1 * | 11/2007 | Golden et al. | 700/295 |
| 2008/0040296 A1 | 2/2008 | Bridges et al. | |
| 2008/0127646 A1 * | 6/2008 | Doland | 60/641.2 |
| 2008/0172279 A1 * | 7/2008 | Enis et al. | 705/8 |
| 2008/0179949 A1 * | 7/2008 | Besser et al. | 307/24 |
| 2008/0185916 A1 * | 8/2008 | Corum et al. | 307/73 |
| 2008/0191560 A1 * | 8/2008 | Besser et al. | 307/126 |
| 2008/0191675 A1 * | 8/2008 | Besser et al. | 323/282 |
| 2009/0033102 A1 * | 2/2009 | Enis et al. | 290/4 R |
| 2010/0094476 A1 | 4/2010 | Hamilton, II et al. | |
| 2010/0244573 A1 * | 9/2010 | Karnick et al. | 307/80 |

* cited by examiner

DYNAMIC SPECIFICATION OF POWER SUPPLY SOURCES

BACKGROUND

1. Technical Field

The present invention generally relates to electrical power consumption and in particular to a mechanism and method for specifying the sources of power and managing the levels of electrical power consumption in electrical devices.

2. Description of the Related Art

A growing number of businesses that sell consumer products or services are providing customers the option to purchase carbon offsets to reduce the harmful effects of carbon dioxide ($CO_2$) emissions on the environment. These harmful carbon dioxide emissions are generally produced by the burning of fossil fuels to provide electricity for these businesses to power a product/device, service, or class of devices or services. Carbon offsets enable individuals and businesses to reduce the carbon dioxide emissions that these individuals and businesses are responsible for by offsetting, reducing or displacing the CO2 in another place, typically where it is more economical to do so. Renewable power sources represent one class of power sources that provides carbon offsets. However, all renewable sources are not the same, nor are all carbon offset providers equal. Therefore, a customer may want to specify a preferred renewable energy provider or preferred carbon offset broker, instead of having to use the services of the providers or brokers that the businesses that provide consumer products or services have chosen. These renewable energy providers may include brokers or providers that are selling "high quality" carbon offsets. This system that allows a customer to specify an energy provider may be applied similarly to transactions within any type of business, for example, transactions associated with airplane travel and hotel stays. In addition, a system by which a consumer specifies the energy provider may also be applied to presently unrealized fields, such as pay-at-the-gas-pump carbon offsets, power consumption at the device level, and product purchases where a product has an associated carbon footprint for the manufacture and transport of the product. In each case the customer's specification information may be used to select the source of power or carbon offset associated with transactions within the particular business field.

Presently, a consumer, a good or a service is unable to specify a power source for a device, service, or class of devices or services. Furthermore, an individual utilization device or service, such as a lighting fixture, appliance, entertainment device, cleaning service, or other such devices or services that use electrical power are unable to specify the source of electrical power. Current solutions each have specific limitations. For example, various devices and service providers obtain power from a single central power grid that is not responsive to a demand for a particular power source. Furthermore, the device is not responsive to the availability of a desired power source or to the preferred device configuration by a device user.

SUMMARY OF ILLUSTRATIVE EMBODIMENTS

Disclosed are a method, a system and a computer program product for specifying the source of power and provider of carbon offsets for an electrical device or service. A power supply specification (PSS) utility enables a user or program to specify a preferred blend of power sources and preferred carbon offset provider via a set of programmable requirements and the utility dynamically configures the electrical device or service, based on those requirements. The PSS utility determines the instantaneous power consumption of the device based on the outputs of sensors that measure voltages and currents associated with the operation of the device. The PSS utility compares the device's power consumption with the power from available power generating sources against the set of programmable requirements. When the available power is unable to satisfy the programmable requirements and/or is not sufficient to fully power the device, the PSS utility automatically places the device into a reduced power state. The PSS utility reports information about the device's power consumption to the power supplier.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, a system and a computer program product for specifying the source of power and provider of carbon offsets for an electrical device or service. A power supply specification (PSS) utility enables a user or program to specify a preferred blend of power sources and preferred carbon offset provider via a set of programmable requirements and the utility dynamically configures the electrical device or service, based on those requirements. The PSS utility determines the instantaneous power consumption of the device based on the outputs of sensors that measure voltages and currents associated with the operation of the device. The PSS utility compares the device's power consumption with the power from available power generating sources against the set of programmable requirements. When the available power is unable to satisfy the programmable requirements and/or is not sufficient to fully power the device, the PSS utility automatically places the device into a reduced power state. The PSS utility reports information about the device's power consumption to the power supplier.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
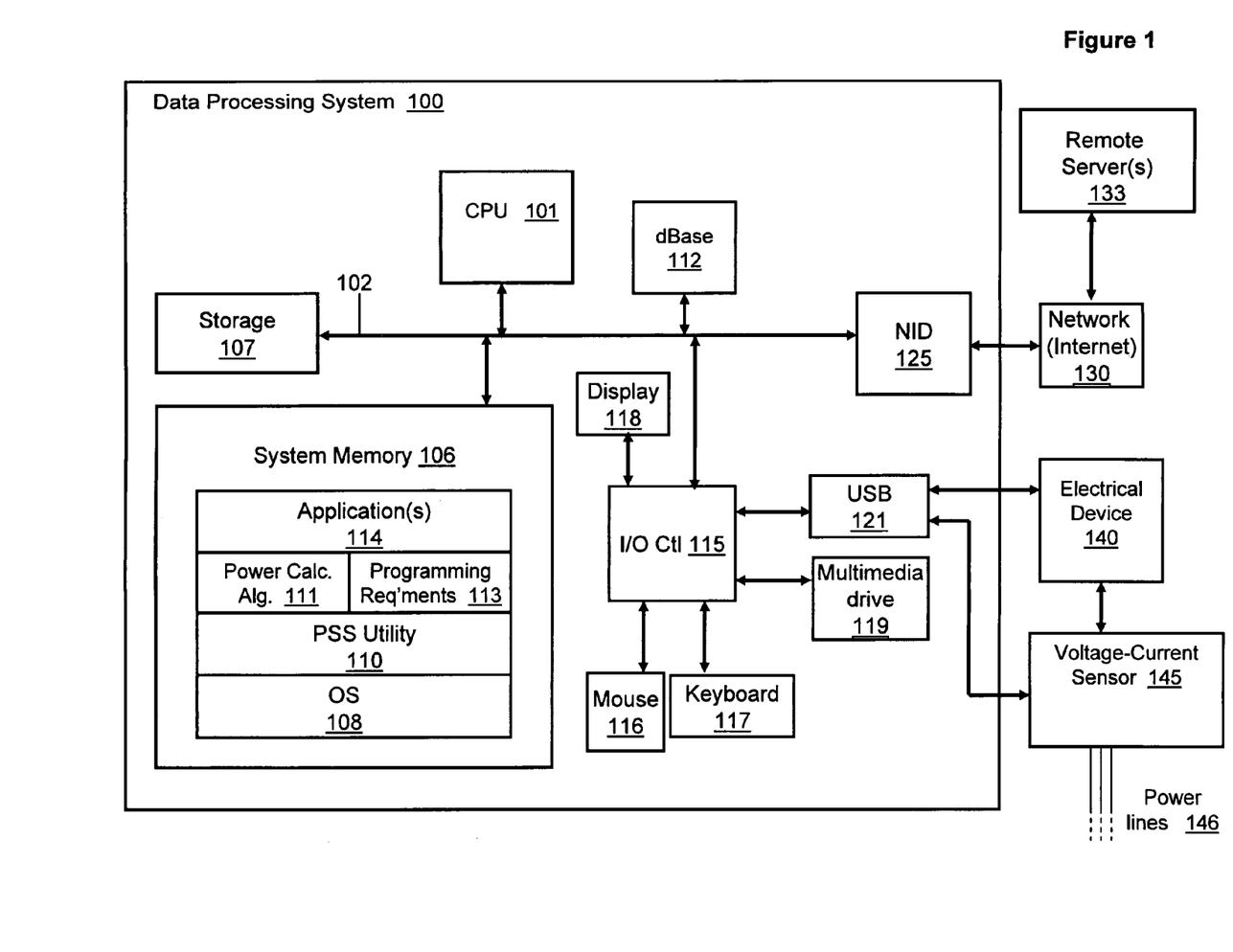
FIG. 1 provides a block diagram representation of data processing within which the invention may be practiced, according to one embodiment of the invention.

With reference now to the figures, and beginning with FIG. 1, there is depicted a block diagram representation of an example data processing system (DPS), as utilized within one embodiment. DPS may be a computer, a portable device, such as a personal digital assistant (PDA), a smart phone, and/or other types of electronic devices that may generally be considered processing devices. As illustrated, DPS 100 comprises at least one processor or central processing unit (CPU) 101 connected to system memory 106 via system interconnect/bus 102. Database 112 is also connected to system bus 102. DPS 100 also comprises storage 107, within/from which data/instructions/code may also be stored/retrieved. Also connected to system bus 102 is input/output (I/O) controller 115, which provides connectivity and control for input devices, of which pointing device (or mouse) 116 and keyboard 117 are illustrated. I/O controller 115 also provides connectivity and control for output devices, of which display 118 is illustrated. Additionally, a multimedia drive 119 (e.g., compact disk read/write (CDRW) or digital video disk (DVD) drive) and USB (universal serial bus) port 121 are illustrated, coupled to I/O controller 115. Multimedia drive 119 and USB port 121 enable insertion of a removable storage device (e.g., optical disk or "thumb" drive) on which data/instructions/code may be stored and/or from which data/instructions/code may be retrieved.

DPS 100 is able to access electrical device 140 and Voltage-Current Sensor 145 via USB port 121. Voltage-Current Sensor 145 is connected to power lines 146 and provides an electrical power interface for Device-1 140. Voltage-Current Sensor 145 uses voltage sensor circuitry and current sensor circuitry to measure the instantaneous power consumption of Device-1 140.

DPS 100 is also illustrated with a network interface device (NID) 125, by which DPS 100 may connect to one or more access/external networks 130, of which the Internet is provided as one example. In this implementation, the Internet represents/is a worldwide collection of networks and gateways that utilize the Transmission Control Protocol/Internet Protocol (TCP/IP) suite of protocols to communicate with one another. NID 125 may be configured to operate via wired or wireless connection to an access point of the network. For example, NID 125 enables communication between DPS 100/device 140 and a Power Supplier to transfer data indicating power consumption levels and available power supply sources and levels, respectively. Network 130 may be an external network such as the Internet or an internal network such as an Intranet. The external and internal networks may both operate over any combination of distributed wide area networks (WAN), local area networks (LAN), and/or, in some cases, logically tunneled networks over WANs and/or LANs such as Virtual Private Networks (VPN). Connection to the external network 130 may be established with one or more servers 133, which may also provide data/instructions/code for execution on DPS 100, in one embodiment.

In addition to the above described hardware components of DPS 100, various features of the invention are completed/supported via software (or firmware) code or logic stored within memory 106 or other storage (e.g., storage 107) and executed by CPU 101. Thus, for example, illustrated within memory 106 are a number of software/firmware/logic components, including operating system (OS) 108 (e.g., Microsoft Windows®, a trademark of Microsoft Corp, or GNU®/Linux®, registered trademarks of the Free Software Foundation and The Linux Mark Institute), applications 114, Programming Requirements 113, Power Calculation Algorithm 111 and Power Supply Specification (PSS) utility 110. In actual implementation, PSS utility 110 may be combined with Programming Requirements 113 and Power Calculation Algorithm 111 to provide a single executable component, collectively providing the various functions of each individual software component when the corresponding combined code is executed by the CPU 101. For simplicity, PSS utility 110 is illustrated and described as a stand alone or separate software/firmware component, which provides specific functions, as described below.

In one embodiment, server 133 represents a software deploying server, and DPS 100 communicates with the software deploying server (133) via network (e.g., Internet 130) using network interface device 125. Then, PSS utility 110 may be deployed from/on the network, via software deploying server 133. With this configuration, software deploying server performs all of the functions associated with the execution of PSS utility 110. Accordingly, DPS 100 is not required to utilize internal computing resources of DPS 100 to execute PSS utility 110.

CPU 101 executes PSS utility 110 as well as OS 108, which supports the user interface features of PSS utility 110. In the described embodiment, PSS utility 110 generates/provides several graphical user interfaces (GUI) to enable user interaction with, or manipulation of, the functional features of PSS utility 110. Certain functions supported and/or implemented by PSS utility utilize processing logic supported by processor 101 and/or device hardware to complete the implementation of that function. For simplicity of the description, the collective body of code that enables these various functions is referred to herein as PSS utility 110. Among the software code/instructions/logic provided by PSS utility 110, and which are specific to the invention, are: (a) code/logic for configuring an electrical device based on a user's preferred blend of power sources or preferred carbon offset provider; (b) code/logic for calculating the instantaneous power consumption of the device based on the measurements of voltage and current sensors; and (c) code/logic for dynamically modifying the behavior/operation level of the device as a result of a comparison of the device's power consumption with the power available from respective power generating sources. According to the illustrative embodiment, when CPU 101 executes PSS utility 110, DPS 100 initiates a series of functional processes that enable the above functional features as well as additional features/functionality. These features/functionalities are described in greater detail below within the description of FIGS. 2-6.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer™ pSeries™ system, a product of International Business Machines Corporation in Armonk, N.Y., running the Advanced Interactive Executive (AIX)® operating system or LINUX® operating system.

Figure 2:
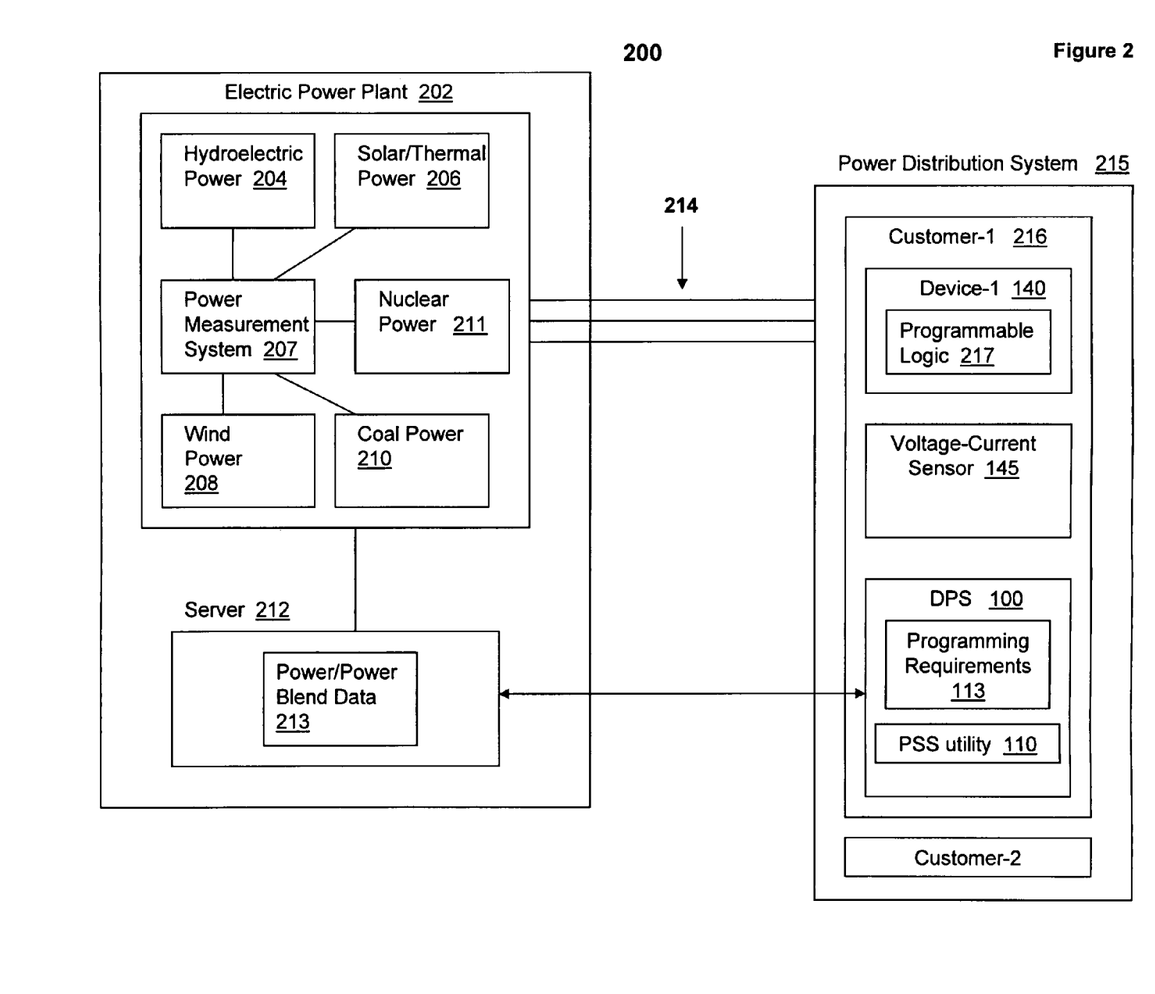
FIG. 2 illustrates a power supply system with an electrical power plant and a connected power distribution system, according to one embodiment.

With reference now to FIG. 2, a power supply system with an electrical power plant and a connected power distribution system is illustrated, according to one embodiment. Power Supply System 200 comprises Electric Power Plant 202, which further comprises multiple power generating sources of which Hydroelectric power 204, Solar/Thermal Power 206, Wind Power 208, Coal Power 210 and Nuclear Power 211 are illustrated. In one embodiment the power generating sources are located at separate (remote) locations. However, electric power from the power generating sources may be collected at one central location illustrated as Electric Power Plant 202. Power Plant 202 also comprises Power Measurement System 207. In addition, Electric Power Plant 202 comprises Server 212. Server 212 comprises available power/blend data 213. Server 212 enables communication (between Power Supply System 200 and customer-1 216) of data indicating power consumption levels and available power supply sources and levels. In one embodiment, Server 212 may be placed at a remote location that is accessible to Power Supply System 200. Electric Power Plant 202 provides electrical power to Power Distribution System 215 through power transmission lines 214. Power Distribution System 215 includes multiple customer locations including Customer-1 216. Customer-1 216 operates electrical device-1 140 which is connected to Voltage-Current Sensor 145. Voltage-Current Sensor 145 provides an electrical power interface for Device-1 140. Voltage-Current Sensor 145 uses voltage sensor circuitry and current sensor circuitry to measure the instantaneous power consumption of Device-1 140. In one embodiment, the functionality of Device-1 140 and Voltage-Current Sensor 145 are integrated within multiple devices. In another embodiment, the functionality of Device-1 140 and Voltage-Current Sensor 145 are integrated within a single device. Customer-1 216 also includes DPS 100. DPS 100 comprises programming requirements 113 and PSS utility 110.

Power supply specification (PSS) utility 110 uses programming requirements for electrical device-1 140 to dynamically configure the device. Programming requirements 113 indicates the customer's preferred blend of power sources or preferred carbon offset provider. In one embodiment, programming requirements 113 are specified by a default dynamic configuration. In one embodiment programming requirements 113 are specified by an imposed dynamic configuration, such as from a corporation, organization, agency, department, or other authority. Programming requirements 113 may be provided by a customer's configuration file or a database entry. In one embodiment, programming requirements 113 are obtained via localized access or via remote access using network communication links. PSS utility 110 determines the instantaneous power consumption of device-1 140 based on the output of voltage and current sensors 145. PSS utility 110 compares the device's power consumption to the power available from respective power generating sources (collectively illustrated as power plant 202) against the set of programming requirements 113. In one embodiment, PSS utility 110 initially compares the device's power consumption with the available power from power plant 202. If the available power is greater than the device's power consumption, PSS utility 110 compares the preferred level and sources of power with the available power. If the preferred power level is greater than the available power, PSS utility 110 allows device-1 140 to utilize the available power and accordingly adjust the operation/behavior of device-1 140. If the preferred power level is less than the available power (but greater than the power consumption), PSS utility 110 allows device-1 140 to utilize the preferred level of power and accordingly adjust the operation/behavior of device-1 140. Instantaneous power consumption may be measured and reported through a plurality of ways, such as by integrating the product of current and voltage over some time interval. Additionally, instantaneous power may be resolved into a real power component, an apparent component of power and a reactive component. Thus, according to the Pythagorean Theorem, the relationship among real, reactive and apparent power is defined as follows: the square of apparent power equals the sum of the square of real power and the square of reactive power. PSS utility 110 may represent electrical power by one or two components, rather than all three components, when such representation provides efficiency, simplicity or some other practical benefit. For example, PSS utility 110 may allow differences in reactive power (corresponding to the various operating levels of the device) to be taken into consideration in one embodiment. In particular, PSS utility 110 may apply one or more components of instantaneous power consumption to the comparisons used in selecting the level of device operation.

The amount of electric power that a device uses may vary over time. An example is an entertainment system where the volume and number of "channels" determines the power being consumed. A higher volume and a larger number of channels (speakers) require more power to produce a richer listening experience. Using this example, PSS utility 110 continually tracks the power being used by the entertainment system. Using pre-programmed expectations of power sources, PSS utility 110 adjusts device behavior periodically in response to the power "blend" (which indicates the types of power sources and respective levels of power) being reported on the electric grid. When the electric grid reports that sufficient power for the desired operating mode is available (sound volume, number of channels), the device operates as requested and the volume and number of channels are unaffected. If the power "blend" is not sufficient to operate in the requested mode, the device may respond by reducing the functionality (e.g., degrading from a "surround sound" experience to simple two channel stereo) or reducing consumption (by lowering the sound volume).

An example electric grid/power plant, for example power plant 202, is comprised of a variety of generating sources, such as hydroelectric power 204, wind power 208, solar power 206, coal 210 and nuclear power 211. Consumers (e.g., customer-1 216) may choose among one or more of these sources to operate device-1 140. Customer-1 216 may choose the types of preferred power to fully utilize a product and to financially support that type of generating capacity. Alternatively, Customer-1 216 may mandate that only certain features are available when certain power sources are available. For example, Customer-1 216 may decide to use decorative lighting only when power is provided by a renewable resource, such as wind power 208, solar power 206 or hydroelectric power 204. PSS utility 110 may specify power sources by category (e.g., renewable and clean, renewable and dirty, non-renewable, etc) or by source (e.g., coal, hydroelectric, nuclear, solar, wind), or by provider.

A further example is provided by an electric system operating on an "off-grid" manner, by which the consumer's devices operate in one mode while functioning on renewable energy sources, such as wind, solar or micro-hydroelectric, but which operate in a different manner when a generator is being used to support the consumer's electric power demands. The power supplier provides currently available power blend information 213 to device-1 140 via server 212 as requested (or periodically). In one embodiment the power blend is published and updated continuously via an Internet-based service. In other embodiments, the power supplier may have Internet connections at local junction boxes or supply centers and retrieve the data from the Internet-based service and republish that data over the power line. In particular, the power supplier may retrieve data corresponding to the power provider by an individual/particular source, accumulate the data from individual sources and re-publish the accumulated data in the form of power blend data.

Figure 3:
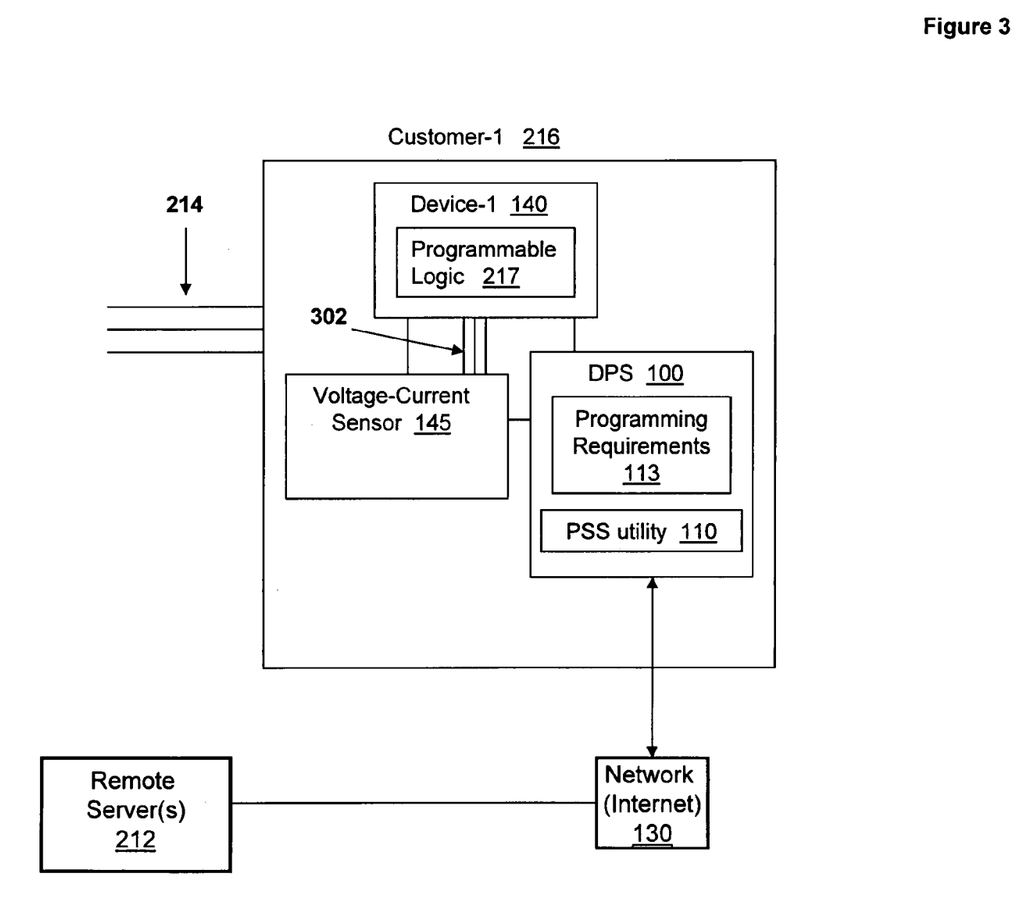
FIG. 3 illustrates an electrical device configured via programmable logic, according to one embodiment.

FIG. 3 illustrates an electrical device configured using programmable logic, according to one embodiment. Customer-1 216 comprises electrical device-1 140 and Voltage-Current Sensor 145. Customer-1 216 receives electrical power through transmission lines 214. Voltage-Current Sensor 145 provides an electrical power interface (as indicated by power lines 302) for Device-1 140. Voltage-Current Sensor 145 uses voltage sensor circuitry and/or current sensor circuitry to measure the instantaneous power consumption of Device-1 140. Customer-1 216 has access to DPS 100. DPS 100 comprises programming requirements 113 and PSS utility 110. DPS 100 is connected to both Device-1 140 and Voltage-Current Sensor 145. DPS 100 communicates with server 212 via network 130.

PSS utility 110 configures electrical device 140 or hardware associated with the provision of a service by using programming requirements 113. In particular, PSS utility 110 configures device/hardware by programming programmable logic using programming requirements 113. Programming requirements 113 specify (a) the amount/level of electrical power and/or carbon offsets desired, (b) the various sources of power or provider of carbon offsets and (c) the preferred proportions of power from the selected sources.

In order to satisfy configuration requirements, PSS utility 110 requests blends of power sources from the power provider or carbon offsets from the carbon offset provider over a communications network (for example, the Internet). PSS utility 110 receives a response from power provider indicating whether there is sufficient availability of the requested power blend, or whether the carbon offset provider acknowledges purchase of carbon offsets. PSS utility 110 allows full operation of the device or the full service to be performed contingent upon the acknowledgement from (a) the power provider to satisfy the request for a specific power blend and/or (b) the carbon offset provider to satisfy the request to purchase carbon offsets. According to the embodiment, the "service" is realized by one or more of: (a) a set of devices; and (b) a purchase of one or more carbon offsets.

Subsequent to the initiation of device operation, PSS utility 110 retrieves a periodic report (sent by the power supplier) indicating the currently available power sources and power blend. PSS utility 110 measures the instantaneous power consumption (IPC) using voltage and current sensor circuitry provided by Voltage-Current Sensor 145. PSS utility 110 compares the IPC (and corresponding power blend) with currently available power sources and power blend. PSS utility 110 determines the level of operation that the available power sources and blend are able to maintain. If the available power sources and blend are sufficient to maintain full operation of the device or service, PSS utility 110 maintains the level of device operation at full operation/performance of the device or service, if the current operation of the device is at the full operation level. Alternatively, PSS utility 110 places the level of device operation at full operation/performance of the device or service, if the current operation of the device is below the full operation level. If the available power sources and blend are not sufficient to maintain full operation of the device or service and the current operation of the device is at the full operation level, PSS utility 110 places the device or service in a reduced power state of operation. For example, a heater placed in a reduced power state may generate a low level of heat. PSS utility 110 transfers information indicating the level of power consumption and power blend of the device or service to the supplier/server 212 via network 130. In one embodiment, the supplier may utilize information about power utilization and preferred power sources and levels to manage acquisition of power from the various power sources.

Figure 4:
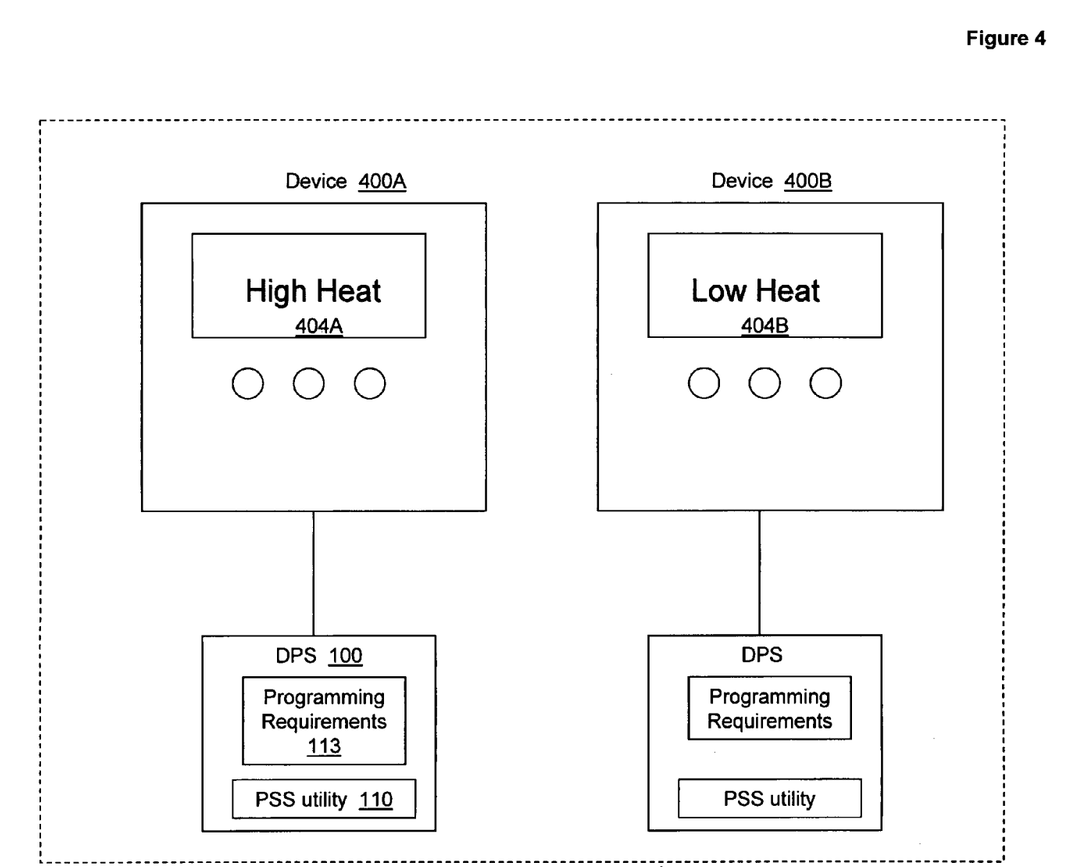
FIG. 4 illustrates an example electrical heater device that operates at multiple power levels by using programmable logic, according to one embodiment.

FIG. 4 illustrates an example electrical heater device that operates at multiple power levels by using programmable logic, according to one embodiment. Devices 400A and 400B comprise two depictions of the same electrical device at different time periods corresponding to different levels of operation. First device 400A comprises LED panel display 404A. Second device 400B comprises LED panel display 404B. First device 400A and second device 400B are connected to DPS 100. DPS 100 comprises programming requirements 113 and PSS utility 110.

First device 400A and second device 400B demonstrate behavior/operation changes in a heater device as indicated by LED panel display 404A and display 404B. Associated with each device or service are various levels of device operation which affect the device's power consumption. For example, a hot tub spa sharing power with a heater may cause a reduction in the blower speed or temperature of the heater from the same power source in response to insufficient power being available from a specific generating source. A low level of available power may cause a refrigerator freezer to disable the ice making or cold-water dispensing feature. A low level of available power may cause a coffee maker to turn down or turn off the warming plate that maintains the coffee's temperature after brewing. Disabling a device or operating in an intermittent manner may also be appropriate for devices in which disabling the device for some period of time does not negatively affect the device. For example, turning off a computer may result in data loss, while turning off landscape lighting may only affect the aesthetics of the landscaping. For device 400A, a unique set of behaviors is defined such that each of those behaviors results in an expected change in power. These changes in behavior may then be associated with the extent to which the requested power is unavailable.

PSS utility 110 requests blends of power sources from the power provider or carbon offsets from the carbon offset provider over a communications network (for example, the Internet). PSS utility 110 receives a response from power provider indicating/acknowledging sufficient availability of the requested power blend. PSS utility 110 enables full operation of first device 400A as indicated by LED panel display 404A showing "HIGH HEAT". LED panel display 404A demonstrates that full power operation occurs because the available power fulfills the power/programming requirements of first device 400A.

If PSS utility 110 retrieves a subsequent periodic report from the power supplier indicating that the currently available power sources and power blend is not sufficient to fulfill the programming requirements, PSS utility 110 initiates low power operation of second device 400B as indicated by LED panel display 404B showing "LOW HEAT". LED panel display 404B demonstrates that reduced power operation occurs since the available power does not satisfy/fulfill the power/programming requirements of second device 400B. The programming requirements are used to configure first device 400A and second device 400B by programming programmable logic 217.

The programmable logic associated with the embodiment takes a form appropriate to the device or service, taking into consideration the impact associated with the specific behavior modification as a result of an insufficient level of available power from the requested source. Some devices may be capable of greater reductions in power in response to insufficient power being available from the requested source. Other devices, such as devices required for health or safety, may not be able to respond with greater reductions in power. In one embodiment, a LED display panel may provide a user with an interface to the device's programmable logic to enable the user to select an operation level from among a range of options. The user interface for the programmable logic would take a form appropriate for the device in question and the method of setting requirements. For example, a hot tub spa may have a menu option on the display panel for setting temperature or blower speed which indicates a temperature or blower speed change in response to there being insufficient power available from the requested source. As another example, an entertainment system may be able to display a richer menu on the video display attached to the system to provide operating options relevant to a low level of available power.

Users configurations for devices or services may also be communicated by means of a link between a user's database over a communication network (e.g., on a handheld device over a dedicated wireless link such as Bluetooth®, or on a remote server over the Internet) to the device or service that the user is currently using. In this way a device or service that is only used temporarily by a user (such as a television in a hotel room) may be configured dynamically, based on a remotely located customer configuration file, to consume power from a particular source and/or to offset carbon emission from a preferred carbon offset provider. Property lighting under the control of the programmable logic may reduce purely decorative lighting, such as the illumination of a business's sign or landscaping, while leaving lighting required for safety unaffected.

Figure 5:
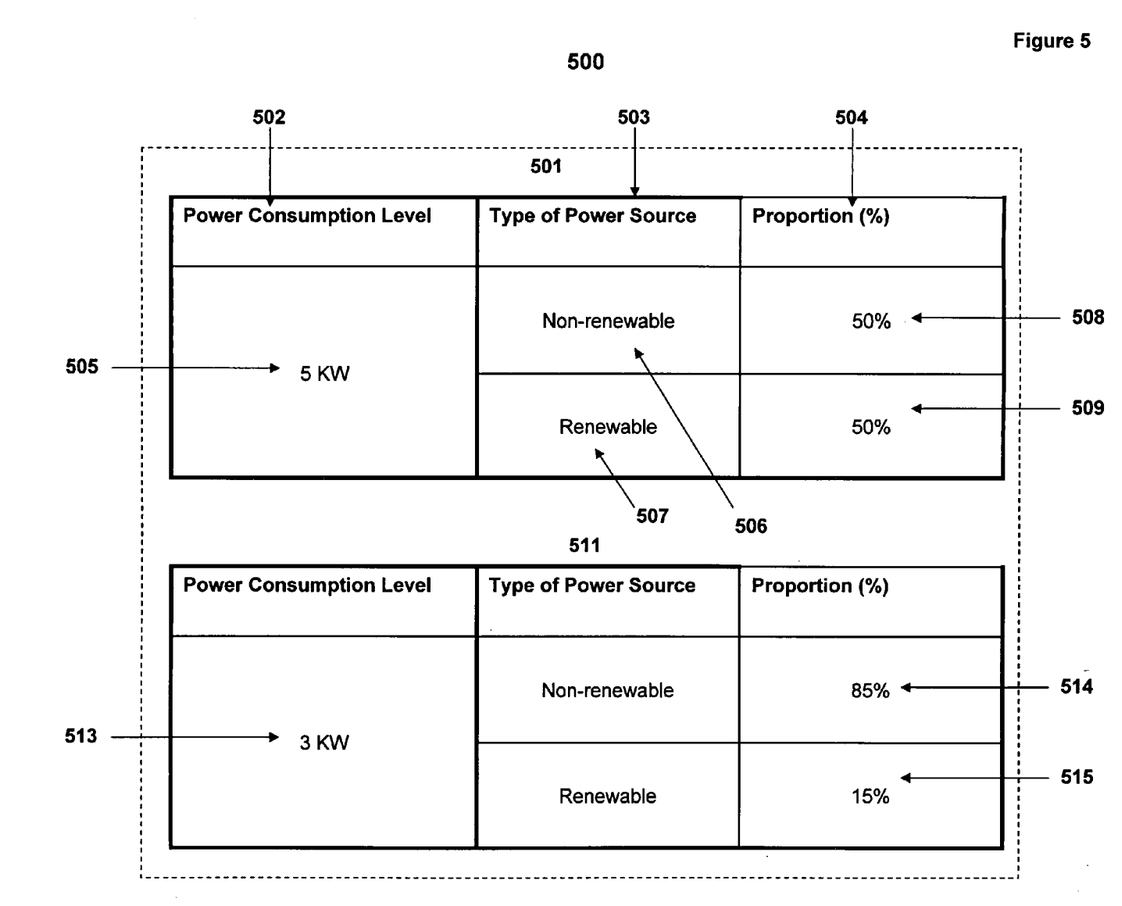
FIG. 5 illustrates two example power consumption information tables corresponding to a device that operates at multiple power levels, according to one embodiment.

FIG. 5 illustrates two example power consumption information tables corresponding to a device (e.g., device 140 of FIG. 1) that operates at multiple power levels, according to one embodiment. Power consumption reports 500 comprises first report/table 501 and second report/table 511. Each report/table contains multiple columns which are illustrated within first table 501 as follows: (a) power consumption level column 502; (b) power sources column 503; and (c) power proportion column 504. First table 501 comprises first power level entry 505, first source entry-1 506 and first source entry-2 507. First table 501 also comprises first power proportion entry-1 508 and first power proportion entry-2 509. Similarly, second table 511 comprises second power level entry 513. Second table 511 contains identical power source entries (within power sources column 503) as is contained within first table 501. Second table 511 also comprises second power proportion entry-1 514 and second power proportion entry-2 515.

At periodic intervals, which may be fixed or adjustable, PSS utility 110 reports the current power consumption, either real or apparent, of device 140 and the current "blend" being consumed by device 140. A fully operating device forwards information about the power being consumed and the user's requested power "blend", such that the amount of power associated with each power source may be determined. The device reports the power blend based on information previously received from the power supplier. A device operating at a reduced power setting, consistent with a behavior modification caused by insufficient power of the requested "blend", may report the current power consumption and the revised/available "blend" that leads to a change in device behavior/operation. For example, a hot tub spa, for which a user panel that displays "high speed blower" and "104F heater" are associated with the "blend" "50% non-renewable, 50% renewable", reports via first device table 501 the full power consumption. For example, device 140 reports a power consumption level of 5 kilowatts (KW), as indicated by first power level entry 505. Device 140 also reports a first power source proportion of 50%, as indicated by first power proportion entry-1 508, a first type of source defined as "non-renewable", as indicated by first device source entry-1 506, a second power source proportion of 50%, as indicated by first power proportion entry-2 509, and a second type of source defined as "renewable", as indicated by first device source entry-2 507, when device 140 is operating as requested. However, in second device table 511, device 140 reports a different set of values when the user panel displays "low speed blower" and "100F heater", as a result of insufficient "renewable" power. Thus, in second table 511, device 140 reports a power consumption level of 3 kilowatts (KW), as indicated by second power level entry 513, a first power source proportion of 85%, as indicated by second power proportion entry-1 514, a first type of source defined as non-renewable, a second power source proportion of 15%, as indicated by second power proportion entry-2 515, and a second type of source defined as "renewable".

Figure 6:
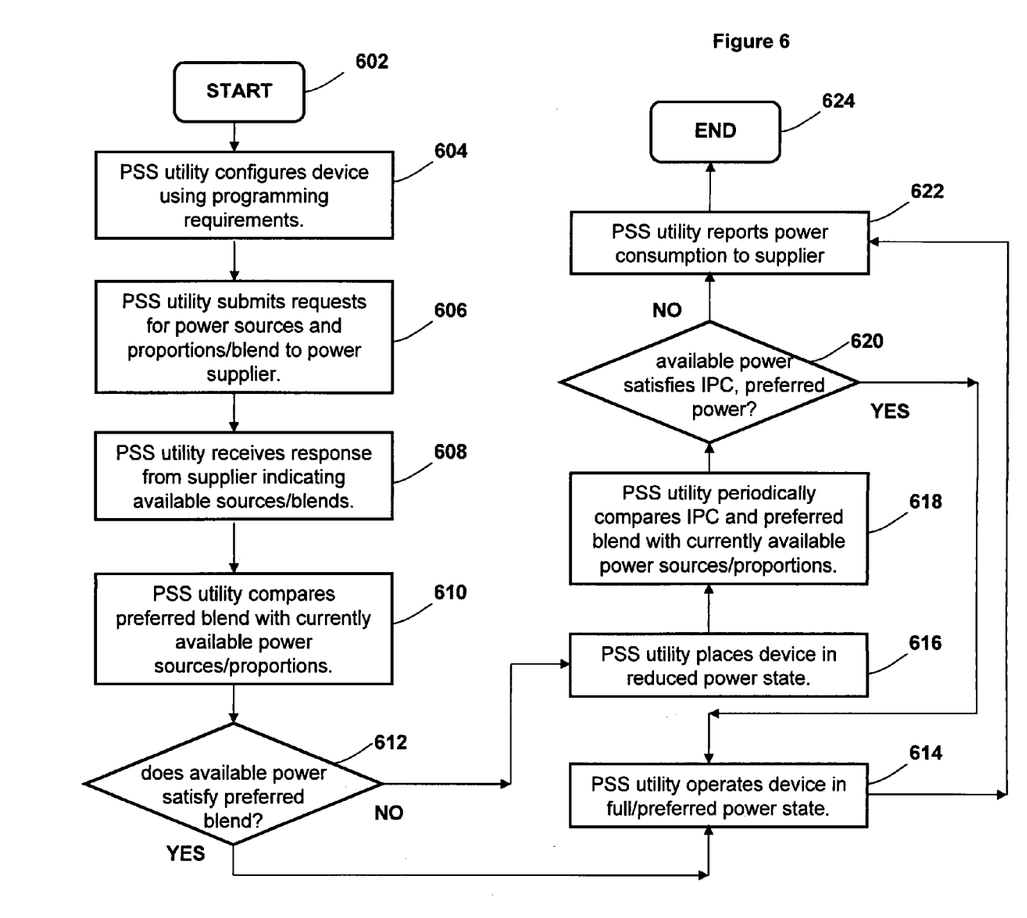
FIG. 6 is a flow chart illustrating the process of operating an electrical device based on specifying the source and amount of power and carbon offset for an electrical device or service and modifying device operation based on the available power, according to one embodiment of the invention.

FIG. 6 is a flow chart illustrating the method by which the above processes of the illustrative embodiments are completed. In particular, FIG. 6 illustrates the process of specifying the source and amount of power and the provider and amount of carbon offsets for an electrical device or service and modifying device operation based on the available power and available carbon offsets. Although the method illustrated in FIG. 6 may be described with reference to components shown in FIGS. 1-5, it should be understood that this is merely for convenience and alternative components and/or configurations thereof can be employed when implementing the various methods. Key portions of the methods may be completed by PSS utility 110 executing on processor 101 within DPS 100 (FIG. 1) and controlling specific operations of/on DPS 100, and the methods are thus described from the perspective of either/both PSS utility 110 and DPS 100.

The process of FIG. 6 begins at initiator block 602 and proceeds to block 604, at which PSS utility 110 configures electrical device 140 or hardware associated with the provision of a service according to programming requirements 113. In particular, PSS utility 110 configures device/hardware by programming programmable logic by using programming requirements 113. Programming requirements 113 specify (a) the amount/level of electrical power and/or carbon offsets desired, (b) the preferred sources of power and/or provider of carbon offsets and (c) the preferred proportions of power from the selected sources. In one embodiment, the power source and provider of carbon offsets are specified at the time of creation/provision of a device/product or service by the manufacturer or service provider. This embodiment allows the programmable logic of the device to be programmed once, and the device or service to be sold with this pre-set configuration in place.

In another embodiment, the power source and carbon offset are specified at the time of purchase or contracting of a device/product or service by the customer. This embodiment allows the programmable logic to be programmed once at the time of the transaction, and the device or service to be acquired/obtained with this pre-set configuration in place. At a time of purchase of the device or contract transaction for the service, PSS utility 110 initiates communication to a customers configuration file or a database entry containing programming requirements 113. Communication to access programming requirements 113 may be enabled by means of any communication network (e.g., Bluetooth® wireless to mobile telephone, or Internet) in order to connect to any appropriate data repository. In one or more embodiments, PSS utility 110 uses a configuring apparatus to configure a device or hardware associated with the device or the provision of a service by programming programmable logic specifying the blend of power sources to be used and/or the provider of carbon offsets.

In yet another embodiment, the power source and carbon offset are specified dynamically at the time of use of a device/product or service by the consumer. For example, a taxicab may be configured dynamically to buy carbon offsets of the customer's preference. Also, a consumer who uses a computer in a library may configure the computer to request a specific power blend from power providers. This embodiment allows the programmable logic to be programmed continually, and the device or service to be used by anyone or any group according to the individual or aggregate configuration parameters. When PSS utility detects initiation of device use by any detection method, PSS utility 110 initiates communication to a customer's configuration file or database entry. If multiple customers are using/obtaining the device/product or service, the customer data may be pooled and analyzed to compute an aggregate configuration (for example, by means of an average). In one embodiment, a single configuration may be provided by one of a variety of methods of conflict resolution. For example, multiple customers may agree to one fixed selection or a randomly selected power source. On the other hand, the multiple customers may agree to the selection of a power source based on a broader default, such as a most environmentally friendly power, a highest level of power, and the like. PSS utility 110 configures the device or hardware using an aggregated set of programming requirements.

Returning to the flow chart, PSS utility 110 requests blends of power sources from the power provider or carbon offsets from the carbon offset provider over a communications network (for example, the Internet), at block 606. PSS utility 110 measures the instantaneous power consumption (IPC) using voltage and current sensor circuitry, at block 610. At block 608, PSS utility 110 receives a response from the power provider indicating sufficient availability of the requested power blend. Additionally, at block 608, PSS utility 110 may also receive acknowledgement of a purchase from the carbon offset provider.

At block 610, PSS utility 110 compares the preferred power blend with currently available power sources and power blend. At decision block 612, PSS utility 110 determines whether the available power sources and blend are sufficient to support full operation of the device or service. If, at block 612, PSS utility 110 determines that the available power sources and blend are sufficient to support full operation of the device or service, PSS utility 110 initiates full operation/performance of the device or service, as shown at block 614. If, at block 612, PSS utility 110 determines that the available power sources and blend are not sufficient to support full operation of the device or service, PSS utility 110 places the device or service in a reduced power state of operation, as shown at block 616. PSS utility 110 periodically compares the device's instantaneous power consumption (IPC) and preferred blend with currently available power sources/proportions, as shown at block 618.

At decision block 620, PSS utility 110 determines whether the available power sources and blend are sufficient to support the IPC and full operation of the device or service. If, at block 620, PSS utility 110 determines that the available power sources and blend are sufficient to support full operation of the device or service, PSS utility 110 initiates full operation/performance of the device or service, as shown at block 614. If, at block 620, PSS utility 110 determines that the available power sources and blend are not sufficient to support IPC or full operation of the device or service, the process proceeds to block 622, at which PSS utility 110 reports the power consumption and power blend of the device or service to the supplier. In one embodiment, the supplier may utilize information about power consumption and preferred power sources and levels (i.e., the power blend) to manage acquisition of power from the various power sources. The process ends at block 624.

In the flow charts above, one or more of the methods are embodied in a computer readable data storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, or by copying the code from the storage device into another storage device such as a hard disk, RAM, etc. The medium may be electronic, magnetic, optical, or semiconductor system (or apparatus or device) Further, the medium may be any apparatus that may store the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, and DVDs.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for controlling behavior of an electrical device, the method comprising the steps of:
   a client computer, coupled to the electrical device, establishing a connection with a server computer of a power supplier via a network, wherein the power supplier receives electrical power from a plurality of power sources;
   the client computer specifying to the power supplier:
   a desired amount of electrical power for the electrical device;
   a subset of power sources, from the plurality of power sources, from which the desired amount of electrical power for the electrical device should be supplied to the electrical device; and
   a proportion of the desired amount of power that should be supplied to the electrical device from each of the power sources in the subset of power sources;
   the client computer determining whether the power supplier can supply the desired amount of electrical power for the electrical device from the specified subset of power sources in the specified proportions; and
   in response to determining that the power supplier cannot supply the desired amount of electrical power for the electrical device from the specified subset of power sources in the specified proportions, the client computer changing behavior of the electrical device such that overall power consumption of the electrical device is reduced.

2. The method of claim 1, wherein at least one of the power sources in the subset of power sources provides electrical power from a renewable energy source.

3. The method of claim 1, further comprising the step of the client computer specifying to the power supplier one or both of:
   a preferred provider for each of the power sources in the subset of power sources; and
   a level of carbon emission offsets that must be met by the power sources in the subset of power sources.

4. The method of claim 1, further comprising the step of:
   prior to the step of determining whether the power supplier can supply the amount of electrical power desired for the electrical device from the specified subset of power sources in the specified proportions, the client computer receiving from the power supplier a report of availability for electrical power from each of the power sources in the subset of power sources.

5. The method of claim 1, further comprising the step of:
   prior to the step of specifying to the power supplier the desired amount of electrical power, the subset of power sources, and the proportion of the desired amount of power that should be supplied from each of the power sources in the subset of power sources, the client computer receiving from a user an input indicating the subset of power sources and an input indicating the proportion of the desired amount of power that should be supplied to the electrical device from each of the power sources in the subset of power sources.

6. The method of claim 1, further comprising the step of the client computer determining a level of power consumption by the electrical device, wherein the desired amount of electrical power for the electrical device is based on the level of power consumption.

7. The method of claim 1, wherein the step of the client computer changing behavior of the electrical device such that overall power consumption of the electrical device is reduced comprises one or more of:
   the client computer reducing functionality of the electrical device;
   the client computer preventing use of one or more features of the electrical device; and
   the client computer setting the electrical device to a reduced power state.

8. The method of claim 1, further comprising the client computer receiving from a user a list of available features for the electrical device, wherein the available features are included in the list depending on availability of power sources.

9. A computer program product for controlling behavior of an electrical device, the computer program product comprising:
one or more computer-readable tangible storage devices and program instructions stored on at least one of the one or more computer-readable tangible storage devices, the program instructions comprising:
program instructions to establish a connection between a client computer, coupled to the electrical device, and a server computer of a power supplier via a network, wherein the power supplier receives electrical power from a plurality of power sources;
program instructions to specify, by the client computer, to the power supplier:
a desired amount of electrical power for the electrical device;
a subset of power sources, from the plurality of power sources, from which the desired amount of electrical power for the electrical device should be supplied to the electrical device; and
a proportion of the desired amount of power that should be supplied to the electrical device from each of the power sources in the subset of power sources;
program instructions to determine, by the client computer, whether the power supplier can supply the desired amount of electrical power for the electrical device from the specified subset of power sources in the specified proportions; and
program instructions, responsive to determining, by the client computer, that the power supplier cannot supply the desired amount of electrical power for the electrical device from the specified subset of power sources in the specified proportions, to change, by the client computer, behavior of the electrical device such that overall power consumption of the electrical device is reduced.

10. The computer program product of claim 9, wherein at least one of the power sources in the subset of power sources provides electrical power from a renewable energy source.

11. The computer program product of claim 9, further comprising program instructions, stored on at least one of the one or more computer-readable tangible storage devices, to specify to the power supplier one or both of:
a preferred provider for each of the power sources in the subset of power sources; and
a level of carbon emission offsets that must be met by the power sources in the subset of power sources.

12. The computer program product of claim 9, further comprising program instructions, stored on at least one of the one or more computer-readable tangible storage devices, to receive from the power supplier a report of availability for electrical power from each of the power sources in the subset of power sources.

13. The computer program product of claim 9, further comprising program instructions, stored on at least one of the one or more computer-readable tangible storage devices, to receive from a user an input indicating the subset of power sources and an input indicating the proportion of the desired amount of power that should be supplied to the electrical device from each of the power sources in the subset of power sources.

14. The computer program product of claim 9, further comprising program instructions, stored on at least one of the one or more computer-readable tangible storage devices, to determine a level of power consumption by the electrical device, wherein the desired amount of electrical power for the electrical device is based on the level of power consumption.

15. The computer program product of claim 9, wherein the program instructions to change behavior of the electrical device such that overall power consumption of the electrical device is reduced comprise one or more of:
program instructions to reduce functionality of the electrical device;
program instructions to prevent use of one or more features of the electrical device; and
program instructions to set the electrical device to a reduced power state.

16. The computer program product of claim 9, further comprising program instructions, stored on at least one of the one or more computer-readable tangible storage devices, to receive from a user a list of available features for the electrical device, wherein the available features are included in the list depending on availability of power sources.

17. A computer system for controlling behavior of an electrical device, the computer system comprising:
one or more computer processors, one or more computer-readable tangible storage devices, and program instructions stored on at least one of the one or more computer-readable tangible storage devices for execution by at least one of the one or more computer processors, the program instructions comprising:
program instructions to establish a connection between a client computer, coupled to the electrical device, and a server computer of a power supplier via a network, wherein the power supplier receives electrical power from a plurality of power sources;
program instructions to specify, by the client computer, to the power supplier:
a desired amount of electrical power for the electrical device;
a subset of power sources, from the plurality of power sources, from which the desired amount of electrical power for the electrical device should be supplied to the electrical device; and
a proportion of the desired amount of power that should be supplied to the electrical device from each of the power sources in the subset of power sources;
program instructions to determine, by the client computer, whether the power supplier can supply the desired amount of electrical power for the electrical device from the specified subset of power sources in the specified proportions; and
program instructions, responsive to determining, by the client computer, that the power supplier cannot supply the desired amount of electrical power for the electrical device from the specified subset of power sources in the specified proportions, to change, by the client computer, behavior of the electrical device such that overall power consumption of the electrical device is reduced.

18. The computer system of claim 17, further comprising program instructions, stored on at least one of the one or more computer-readable tangible storage devices for execution by at least one of the one or more computer processors, to specify to the power supplier one or both of:
a preferred provider for each of the power sources in the subset of power sources; and
a level of carbon emission offsets that must be met by the power sources in the subset of power sources.

19. The computer system of claim 17, further comprising program instructions, stored on at least one of the one or more computer-readable tangible storage devices for execution by at least one of the one or more computer processors, to receive from a user an input indicating the subset of power sources and an input indicating the proportion of the desired amount of power that should be supplied to the electrical device from each of the power sources in the subset of power sources.

20. The computer system of claim 17, wherein the program instructions to change behavior of the electrical device such that overall power consumption of the electrical device is reduced comprise one or more of:
- program instructions to reduce functionality of the electrical device;
- program instructions to prevent use of one or more features of the electrical device; and
- program instructions to set the electrical device to a reduced power state.

* * * * *